US011870806B1

(12) United States Patent
Qian et al.

(10) Patent No.: US 11,870,806 B1
(45) Date of Patent: Jan. 9, 2024

(54) PHISHING ATTACK TRAINING SYSTEMS AND METHODS

(71) Applicant: Rapid7, Inc., Boston, MA (US)

(72) Inventors: Jin Qian, Austin, TX (US); Brent Cook, Pflugerville, TX (US)

(73) Assignee: Rapid7, Inc., Boston, MA (US)

( * ) Notice: Subject to any disclaimer, the term of this patent is extended or adjusted under 35 U.S.C. 154(b) by 363 days.

(21) Appl. No.: 16/669,817

(22) Filed: Oct. 31, 2019

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/1433* (2013.01); *H04L 63/20* (2013.01)

(58) Field of Classification Search
None
See application file for complete search history.

(56) References Cited

U.S. PATENT DOCUMENTS

| 10,657,248 | B2 * | 5/2020 | Lowry | G06F 11/3409 |
|---|---|---|---|---|
| 2009/0144308 | A1 * | 6/2009 | Huie | H04L 63/1483 707/999.102 |
| 2016/0164898 | A1 * | 6/2016 | Belani | H04L 63/1483 726/23 |
| 2017/0235829 | A1 * | 8/2017 | Han | G06F 16/951 707/706 |
| 2019/0034623 | A1 * | 1/2019 | Lowry | G06F 16/1734 |

* cited by examiner

*Primary Examiner* — Joseph P Hirl
*Assistant Examiner* — Hassan Saadoun
(74) *Attorney, Agent, or Firm* — Ashwin Anand

(57) ABSTRACT

Systems and methods for user training. The systems and methods involve deploying at least one static file on a computing resource controlled by an operator, transmitting a URL to a target user, receiving a request for the URL from the target user, transmitting the at least one static file to the target user for execution in a web browser of the user, and receiving data regarding the execution of the at least one static file.

20 Claims, 3 Drawing Sheets

PHISHING ATTACK TRAINING SYSTEMS AND METHODS

TECHNICAL FIELD

Embodiments described herein relate to methods and systems for user training and, more particularly but not exclusively, to methods and systems for training users regarding phishing attacks.

BACKGROUND

Companies, governments, and other types of institutions or entities (for simplicity, "entities") are at increasing risk of cyberattacks. Malicious actors frequently launch phishing attacks in which they gain access to networks or resources thereon by enticing an unsuspecting employee to click on a seemingly-benign activation link (e.g., sent through an email).

If an employee or other personnel clicks on this type of link (albeit under the assumption they are dealing with a trustworthy source), harmful software may be downloaded to their computer and their network. This software may, for example, initiate an exfiltration procedure in which data is sent out from the target user's computer or network to a location associated with the malicious actor. Additionally or alternatively, the software may allow the malicious actor to gain access to the target user's network, escalate their own privileges, or the like.

In an effort to thwart these phishing attacks, entities often train their employees or users how to avoid these types of attacks. These training campaigns often involve sending mock phishing emails with links and then noting which employees clicked on the link. Employees that do click on the link may be designated for further training about phishing attacks and how to avoid being victimized.

When performing a phishing training campaign using a web-based phishing training application, an entity may prefer using their own network domains and servers to host the landing or training pages (resources) instead of those hosted by a third party, such as the developer of the phishing training application. However, existing techniques for conducting these training campaigns generally rely on third party resources to create, execute, and monitor the phishing training application and target users' interactions therewith. This prevents the user from customizing the campaign in a way to make emails, links, landing pages, or the like, appear as realistic and authentic as possible.

An existing technique for phishing training using entity-controlled resources requires that the server itself provide the ability to execute code that tracks the target user's behavior and reports it directly back to the phishing training application. This technique is expensive for developers of the phishing training application because there is a great variety of possible server environments onto which a user may wish to deploy resources. In addition to requiring the development and testing of a wide number of possible targets, this requires the entity's developers to install and maintain software that may affect system stability, be difficult to deploy, or cause operational delays that reduce the effectiveness and timeliness of a phishing campaign.

A need exists, therefore, for systems and methods that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for user training. The method includes deploying at least one static file on a computing resource controlled by an operator, the at least one static file comprising executable code and being accessible by a URL, transmitting the URL to a target user, receiving a request for the URL from the target user, transmitting the at least one static file to the target user for execution in a web browser of the target user, and receiving data regarding the execution of the at least one static file.

In some embodiments, the data regarding the execution of the at least one static file comprises at least one interaction between the target user and the at least one transmitted static file executing in the web browser of the target user. In some embodiments, the interaction includes at least one of a click on a link associated with the URL and credentials provided by the target user.

In some embodiments, receiving the data regarding the execution of the at least one static file includes at least one of receiving the data through a predetermined endpoint, receiving a transmitted resource, and receiving the data through a side-channel to another resource controlled by the operator.

In some embodiments, the received data includes an identifier that encodes data regarding the target user and target user interactions with the at least one static file.

In some embodiments, wherein the method further includes associating an identifier with the target user. In some embodiments, associating the identifier with the target user includes embedding the identifier in the transmitted URL.

In some embodiments, the method further includes receiving the at least one static file from a third party phishing application provider. In some embodiments, receiving data regarding the execution of the at least one static file involves receiving the data from the third party phishing application provider.

According to another aspect, embodiments relate to a system for user training. The system includes a processor executing instructions stored on a memory configured to deploy at least one static file on a computing resource controlled by an operator, the at least one static file comprising executable code and being accessible by a URL; and an interface configured to at least transmit the URL to a target user, receive a request for the URL from the target user, transmit the at least one static file to the target user for execution in a web browser of the target user, and receive data regarding the execution of the at least one static file.

In some embodiments, the data regarding the execution of the at least one static file comprises at least one interaction between the target user and the at least one transmitted static file executing in the web browser of the target user. In some embodiments, the interaction includes at least one of a click on a link associated with the URL and credentials provided by the target user.

In some embodiments, the data regarding the execution of the at least one static file is received through at least one of a predetermined endpoint, receiving a transmitted resource, and receiving the data through a side-channel to another resource controlled by the operator.

In some embodiments, the received data includes an identifier that encodes data regarding the target user and target user interactions with the at least one static file.

In some embodiments, the processor is further configured to associate an identifier with the target user. In some embodiments, the processor associates the identifier with the target user by embedding the identifier in the transmitted URL.

In some embodiments, the interface is further configured to receive the at least one static file from a third party phishing application provider. In some embodiments, the data regarding the execution of the at least one static file is received from the third party phishing application provider.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

As discussed above, pages and resources of existing phishing training campaigns are generally hosted by the phishing application provider. However, customers of these phishing applications may prefer to use their own network domains and servers to host landing or training pages associated with training exercises.

Hosting these pages via customer-controlled assets results in higher authenticity and realism for their users, better control over the content presented to phishing targets, and avoids triggering the customer's anti-spam and anti-phishing mechanisms that can reduce the effectiveness of a phishing exercise. That is, anti-phishing mechanisms may prevent the material associated with the phishing exercise from reaching a target user, or may warn a target user that a received link is likely malicious or is otherwise associated with a phishing attempt. These mechanisms would therefore reduce the overall effectiveness of the phishing training campaign.

In order for a phishing training application to be effective, it also needs to obtain statistics about how target users interacted with those resources, such as their click-through rate and whether credentials or other sensitive data were shared. For example, a customer may want to know whether a target user clicked on an activation link, whether the target user interacted with any pages of the phishing application (e.g., their click-through rate), whether the target user downloaded software, whether the target user uploaded documents or other types of data, etc. However, because a customer may use almost any kind of technology internally to host these resources, it can be expensive and complex for phishing training application developers to build server-side technologies that will work across a variety of user environments.

The embodiments described herein provide systems and methods in which static pages for templates can be hosted in customer-provided servers while reporting to servers controlled by the phishing training application provider to transmit the phishing events occurring when the customer's target users interact with the phishing pages. More specifically, the embodiments described herein provide solutions that implement the business logic of tracking target user interactions with resources directly in the target user's web browser, thereby removing the need to implement business logic on the customer's servers. By only requiring the customer to host static resources, the embodiments described herein provide simpler and easier solutions for entities to deploy phishing training resources in almost any customer-controlled environment at a low-cost, and with minimal interaction with existing deployed technologies.

Figure 1:
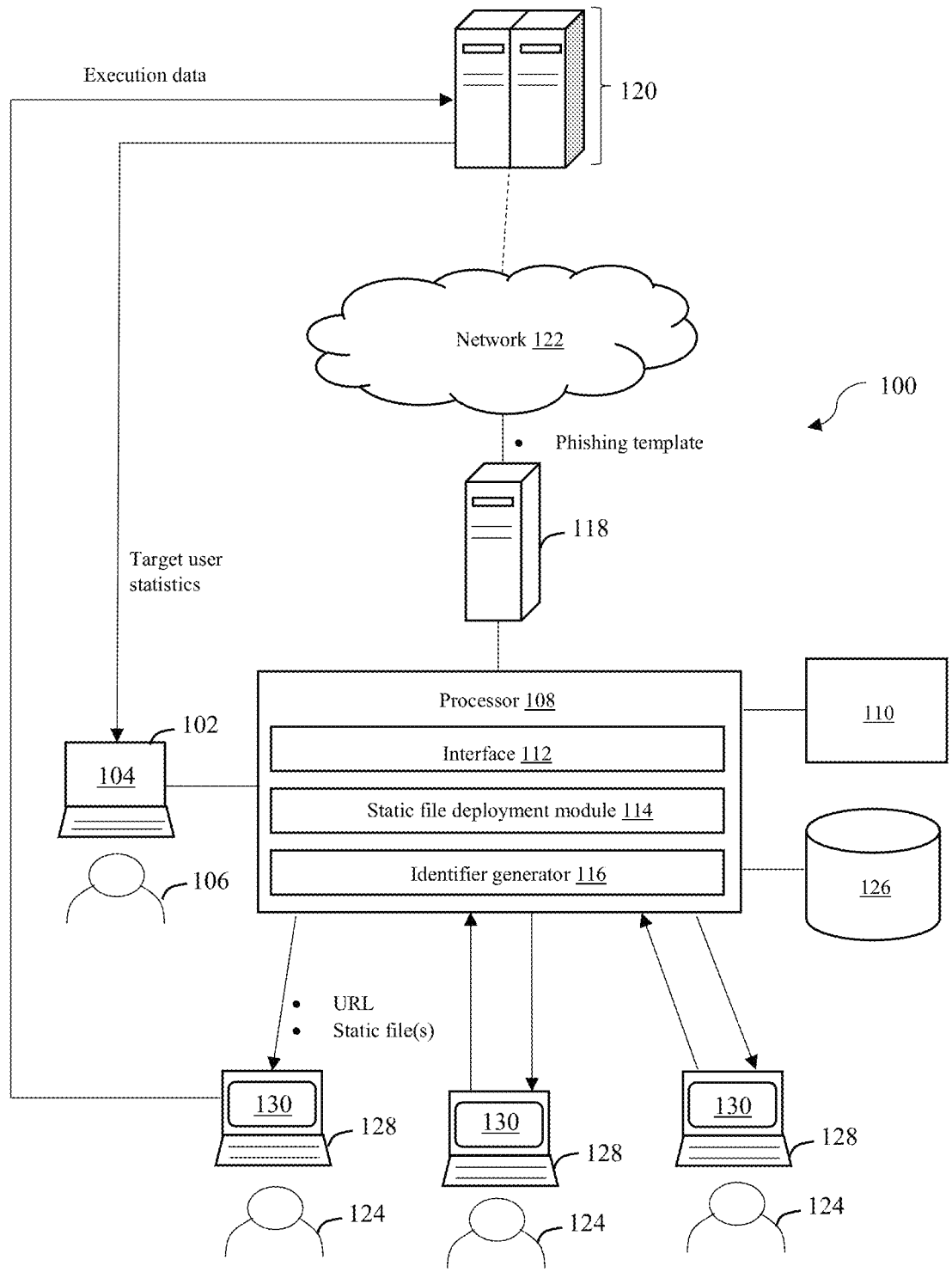
FIG. 1 illustrates a system for user training in accordance with one embodiment.

FIG. 1 illustrates a system 100 for user training in accordance with one embodiment. The system 100 may include one or more operator devices 102 executing a user interface 104 for presentation to an operator 106. The operator 106 may be a network administrator of a customer or otherwise someone interested in monitoring the security of a company's network. In this case, the operator 106 may be interested in launching a phishing training campaign against the customer company's employees, for example.

The operator device 102 may be any hardware device capable of executing the user interface 104. The operator device 102 may be configured as a laptop, PC, tablet, mobile device, or the like. The exact configuration of the operator device 102 may vary as long as it can execute and present the user interface 104 to the operator 106. The user interface 104 may allow the operator 106 to define characteristics or other types of parameters associated with the phishing training campaign.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a static file deployment module 114, and an identifier generator 116.

The memory 110 may be L1, L2, or L3 cache or RAM memory configurations. The memory 110 may include non-volatile memory such as flash memory, EPROM, EEPROM, ROM, and PROM, or volatile memory such as static or dynamic RAM, as discussed above. The exact configuration/ type of memory 110 may of course vary as long as instructions for launching the phishing training campaigns for user training can be executed by the processor 108 to accomplish the objectives of the various embodiments described herein.

The interface 112 may receive phishing application templates from one or more client servers 118 associated with the operator or customer (for simplicity, "local server 118)". These phishing application templates may in turn be provided to the local server 118 over one or more networks 122 by one or more phishing training provider's servers 120 (for simplicity, "training server 120").

The training servers 120 may be associated with a third party vendor such as a company that develops phishing training applications. In addition to providing the phishing training application, the training servers 120 may also receive data regarding the execution of a training phishing application, including target users' interactions with the application.

The training servers 120 may receive data regarding a target user's interactions in a variety of ways. For example, these data transmittal techniques may involve posting data regarding interactions directly to an application endpoint at the training server 120, downloading a specially-named static resource, dynamically generating a Javascript file, or by some other method for tracking via the training server 120.

The network(s) 122 may link the various assets and components with various types of network connections. The network(s) 122 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 122 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the operator 106 may install one or more phishing templates in the local server 118 that are used to generate the phishing application landing pages. The operator 106 will install a phishing template in local server 118 as a set of static files and provide a URL to access it to the phishing training provider's server (e.g., the training server 120). For example, the operator 106 may provide a URL such as https://customerServer/template_p1.

These static files may include HTML files, CSS files, images, videos, documents, fonts, data objects, or the like. This list is non-exhaustive, and other types of data or objects may be included in the static files.

The static files may be specifically designed to mimic or otherwise look similar to a client company's webpages. For example, the static files may be configured to present pages that use a company's logo, slogans, colors, or the like. Accordingly, this allows the operator 106 to launch a more authentic phishing training application that is more likely to generate meaningful results.

In order to track individual target user behavior using only a static resource, a target user identifier still needs to be associated with the data submitted to the campaign. To accomplish this, a target user identifier is embedded in the URL which points to the static resource hosted by the operator 106 (i.e., by the customer). In the target user's web browser, Javascript that examines this URL executes to craft an appropriate dynamic request to the phishing application and reports the target user's behavior. The training server 120 records these events and provides reports of target user behavior to operator 106.

In some embodiments, the identifier generator 116 of FIG. 1 may assign to each target user 124 a unique identifier for tracking purposes. Data regarding target users 124 and their associated unique identifiers may be stored in one or more databases 126. As discussed above, these identifiers may be embedded in the URL sent to the target user 124, and may encode information about both the target user 124 and the event type.

The static file deployment module 114 may launch a training campaign against one or more target users 124. As discussed above, these target users 124 may be employees of a company or a government body, for example. The target users 124 may each be associated with one or more target user devices 128 that each executes a target user interface 130. The target user devices 128 may be similar to the operator device 102, and the target user interfaces 130 may be similar to the user interface 104, for example.

In some embodiments, the training campaign may initiate with an email being sent to a target user 124. The content of the email may appear benign, and may include instructions or suggestions for the target user 124 to click on an included link (which is common in phishing attacks). The operator 106 may launch a phishing training campaign via the training server 120 by sending campaign emails (or other types of messages) with a link such as https://customer-Server/template_p1?id=.

Figure 2:
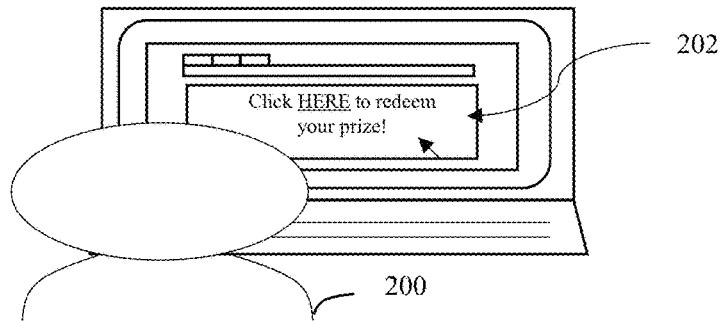
FIG. 2 illustrates a target user being presented with a phishing training email in accordance with one embodiment.

For example, FIG. 2 illustrates a target user 200 being presented with a phishing training email 202. In FIG. 2, the email 202 may incorrectly inform the target user 200 that they have won a prize, and may instruct the target user 200 to click on an embedded link to redeem the prize. In reality, and as common with phishing attacks, there is no such prize but rather the link, if clicked, may execute a number of other programs or applications.

When the target user 124 clicks on this type of link, the target user's browser will fetch and render the static files and execute the embedded JavaScript code. This code then reports on the phishing-link-click event(s) to the training server 120 along with the information encoded in the phishing URL.

An exemplary code portion in Javascript is seen below. This portion of code has the advantage of functioning like a normal Javascript file on retrieval, which is a common part of loading a webpage.

var targetId=hrf.location.match(/\?=id(.*)/[1]
    var phishscript=document.createElement('script');
    phishscript.src=https:///+targetId;
    document.getElementsByTagName('body')[0].append-
        Child(phishscript).

As discussed above, there are various means for the client-side Javascript to report the events to the training server 120, such as by accessing a specific application endpoint, uploading a resource, or by a side-channel such as accessing another user-controlled resource. The encoded information identifying a specific target user 124 can also be encoded by file name of resource, variables appended after the resource identifier, or via environmental identifiers such as the target user's browser fingerprint. Since the JavaScript code is hosted within a user's environment, it also can take advantage of keyed identifiers and access same-domain resources for ensuring that it is running in the expected environment.

After receiving this request, the training server 120 may record the landing event from the target user 124 and return a piece of Javascript code. For example, events may be recorded such as whether a target user 124 clicked on the original link, whether the target user 124 navigated certain pages of the phishing training application, whether the target user 124 provided credentials or other sensitive information, the amount of time the target user 124 spent interacting with pages of the phishing application, etc. To convey data regarding the target user's interactions, the training server 120 may return a piece of code such as:

document.getElementsByTagName('form')[0].setAttribute("action",https://customer Server/template_p2?id=).

The above JavaScript may execute in the target user's browser and will change the target user for the form element to point to another page in the campaign. This process may repeat and cause the events such as a credential-submitted event and other types of events to be recorded by the training server 120.

Figure 3:
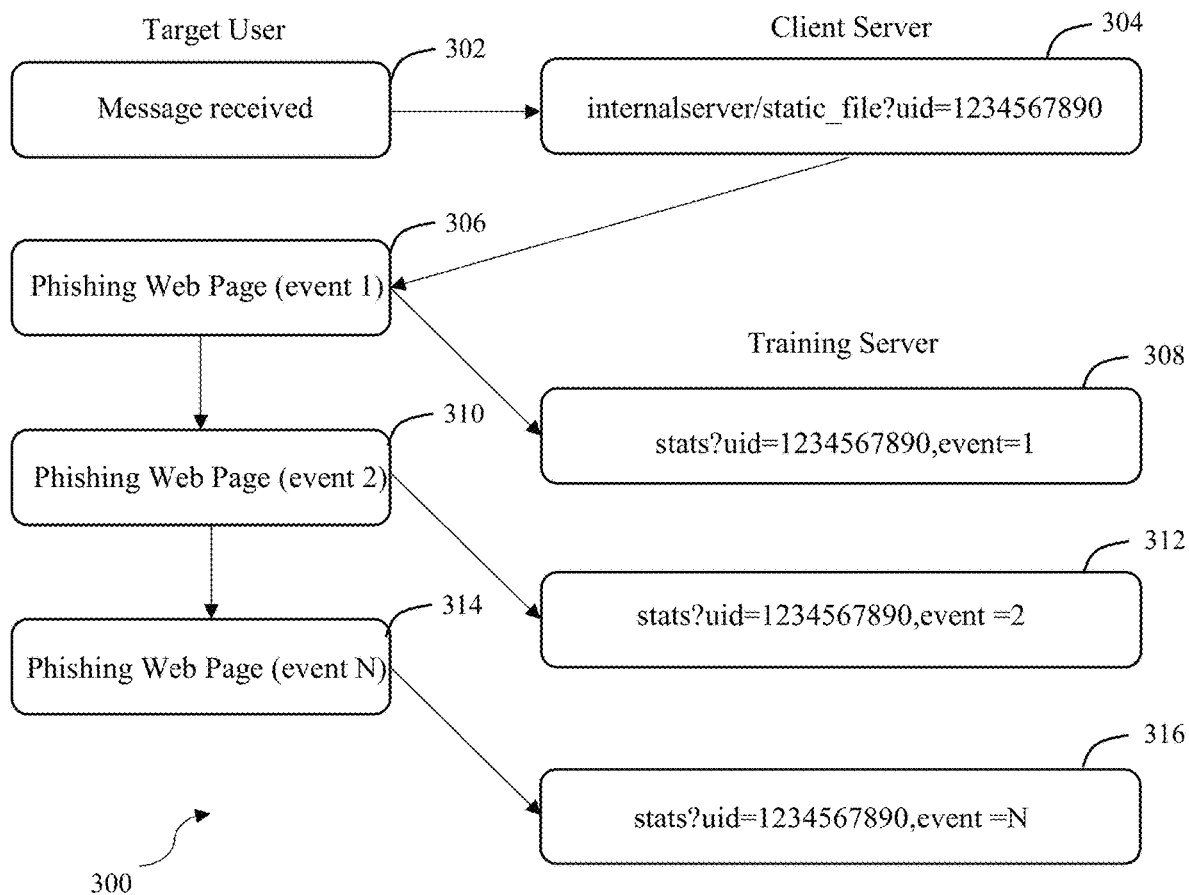
FIG. 3 illustrates a workflow of a phishing training process in accordance with one embodiment.

FIG. 3 illustrates a workflow 300 of the phishing training process 300 in accordance with one embodiment. As seen in FIG. 3, a target user may receive a message at step 302. Although the above description discusses email as the primary means of communicating messages to target users, other means of communication may be used as well. For example, a phishing training campaign may be initiated through sending messages through SMS, chat applications, or the like.

If the target user clicks on a link in the message, the target user's browser may retrieve static files associated with the training campaign at step 304. For example, the link may retrieve the static file "internalserver/static_file?uid=1234567890." It is noted that in this case, the identifier generator 116 may have assigned the target user the identifier "1234567890."

The local server 118 may then serve the static content with embedded Javascript code to produce a first page of the phishing application at step 306. This page may appear to be associated with the target user's employer, for example. Accordingly, users such as network administrators may create a more authentic and realistic training campaign that is more likely to entice unsuspecting target users.

As the target user interacts with the phishing pages, such as through clicks, uploading data, downloading data, by providing credentials, or the like, their actions may be represented by events that are communicated to the phishing training provider's server. For example, at step 308, the phishing training provider's server may store an event as "stats?uid=1234567890,event=1."

Additional target user interactions may be tracked as well. In step 310, the target user performs a second interaction with a phishing web page (which may be the same or different page than in step 306). As in step 306, data regarding the interaction event may be stored as "stats?uid=1234567890,event=2." This process may continue for any number N of events, as seen in steps 314 and 316.

Figure 4:
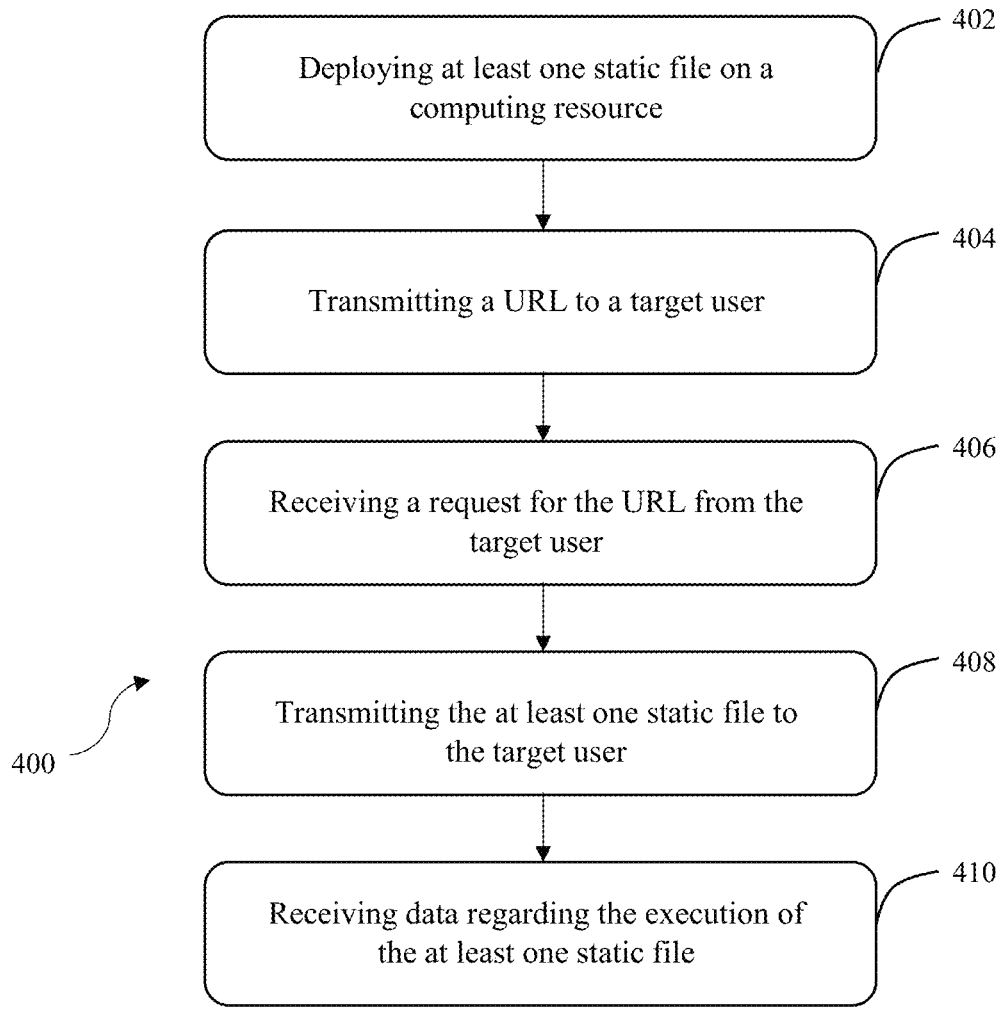
FIG. 4 depicts a flowchart of a method for user training in accordance with one embodiment.

FIG. 4 depicts a flowchart of a method 400 for user training in accordance with one embodiment. Step 402 involves deploying at least one static file on a computing resource controlled by an operator, wherein the at least one static file comprises executable code and is accessible by a URL. The operator may be a user such as the operator 106 of FIG. 1, for example, and may be in charge of monitoring the security of a customer company's network. Although the methods and systems described herein are largely directed towards training target users regarding phishing attacks, the embodiments herein can be used in other web server simulation scenarios as well. These may include security training companies and other types of industries.

As discussed previously, static files associated with a phishing training application may be stored on a client resource such as the local server 118 of FIG. 1. These static files may include HTML files and images used to create pages of a phishing training application. Additionally, the computing resource provides a URL to access the static files to a phishing training application provider.

Step 404 involves transmitting the URL to a target user. Step 404 may involve sending out an email or other type of message to one or more target users. These target users may be employees of a company, for example. The transmitted message(s) may include one or more links and accompanying text to entice the target users to click on the presented links. Regardless of the exact text or appearance of the message, the included content should appear authentic in that the target user is at the very least not discouraged from clicking on the link.

Step 406 involves receiving a request for the URL from the target user. If the target user clicks on the link in the message, a processor such as the processor 108 may receive a request for the target URL.

Step 408 then involves transmitting the at least one static file to the target user for execution in a web browser of the user. The static file(s) may form one or more pages of training application with the goal of enticing the target user to interact with pages of the application. These pages may, for example, instruct the target user to provide credentials, download files, upload files, or the like.

Step 410 involves receiving data regarding the execution of the at least one static file. Data regarding the target user's interaction(s) with the pages may be communicated to a server or other type of computing resource associated with the phishing training application provider. This data may be communicated to the client company or an operator associated therewith, who may be interested in determining which of their employees were victims of the phishing training campaign. These employees may then be instructed to, for example, complete a seminar in which they learn about the dangers of phishing attacks and how to avoid them.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
deploying at least one static file on a computing resource of a company network, wherein the computing resource is controlled by an operator of the company, and the at least one static file comprises code executable by web browsers and being accessible by a URL;
transmitting the URL that provides access to the at least static file to a target user device of a target user;
receiving a request for the URL that provides the access to the at least one static file from the target user device;
transmitting the at least one static file from the computing resource of the company network to the target user device, wherein the transmission causes execution of the code in a web browser of the target user device, the execution including:
obtaining a phishing script for the target user based on an identifier of the target user;
tracking user interactions with the URL via the web browser and according to the phishing script; and
sending, to a training server controlled by a third party phishing application provider, the user interactions as individual events, wherein each event indicates an event identifier and the identifier of the target user.

2. The method of claim 1 wherein the phishing script is obtained from the third party phishing application provider.

3. The method of claim 1 wherein the user interactions include at least one of a click on a link associated with the URL and a transmission of a user credential of the target user.

4. The method of claim 1 wherein receiving the data regarding the user interactions includes at least one of receiving the data through a predetermined endpoint, receiving a transmitted resource, or receiving the data through a side-channel to another resource controlled by the operator.

5. The method of claim 1 wherein the received request includes an identifier that identifies the target user.

6. The method of claim 1 further comprising associating an identifier with the target user.

7. The method of claim 6 wherein associating the identifier with the target user includes embedding the identifier in the transmitted URL.

8. The method of claim 1 further comprising receiving the at least one static file from the third party phishing application provider.

9. The method of claim 8, wherein the static file is a webpage template that mimics a webpage of the company and includes one or more of an image, a video, a document, a logo, a slogan, or a Cascading Style Sheet (CSS) file associated with the company.

10. A system, comprising:
one or more processors and memory storing instructions executable by the one or more processors to:
deploy at least one static file on a computing resource of a company network, wherein the computing resource is controlled by an operator of the company, and the at least one static file comprises code executable by web browsers and being accessible by a URL;
transmit the URL that provides the access to the at least one static file to a target user device of a target user;
receive a request for the URL from the target user device;
transmit the at least one static file from the computing resource of the company network to the target user device, wherein the transmission causes execution of the code in a web browser of the target user device, including to:
obtain a phishing script for the target user based on an identifier of the target user;
track user interactions with the URL via the web browser and according to the phishing script; and
send to a training server controlled by a third party phishing application provider, the user interactions as individual events, wherein each event indicates an event identifier and the identifier of the target user.

11. The system of claim 10 wherein the phishing script from the third party phishing application provider.

12. The system of claim 10 wherein the user interactions include at least one of a click on a link associated with the URL and a transmission of a user credential of the target user.

13. The system of claim 10 wherein the data regarding the user interactions is:
received through at least one of a predetermined endpoint,
received via a transmitted resource, or
received through a side-channel to another resource controlled by the operator.

14. The system of claim 10 wherein the received request includes the identifier that identifies the target user.

15. The system of claim 10 wherein the one or more processors is further configured to associate the identifier with the target user.

16. The system of claim 15 wherein the one or more processors associates the identifier with the target user by embedding the identifier in the transmitted URL.

17. The system of claim 10 wherein the one or more processors is further configured to receive the at least one static file from the third party phishing application provider.

18. The system of claim 17 wherein the static file is a webpage template that mimics a webpage of the company and includes one or more of an image, a video, a document, a logo, a slogan, or a Cascading Style Sheet (CSS) file associated with the company.

19. A non-transitory computer-readable medium storing program instructions that when executed by one or more processors cause the one or more processors to perform:
transmitting a URL to a target user device, wherein the URL accesses at least one static file comprising code executable by web browsers, and the static file is deployed on a computing resource of a company network and controlled by an operator of the company;
receiving a request for the URL that provides access to the at least one static file from the target user device;
transmitting the at least one static file from the computing resource of the company network to the target user device, wherein the transmission causes execution of the code in a web browser of the target user device, the execution including:
obtaining a phishing script for the target user based on an identifier of the target user;
tracking user interactions with the URL via the web browser and according to the phishing script; and
sending to a training server controlled by a third party phishing application provider, the user interactions as individual events, wherein each event indicates an event identifier and the identifier of the target user.

20. The non-transitory computer-readable medium of claim 19, wherein the phishing script is obtained from the third party phishing application provider.

\* \* \* \* \*